Oct. 15, 1940.                F. V. LONG                    2,217,959
                        GAUGE APPARATUS FOR TANKS
                         Filed Aug. 16, 1938
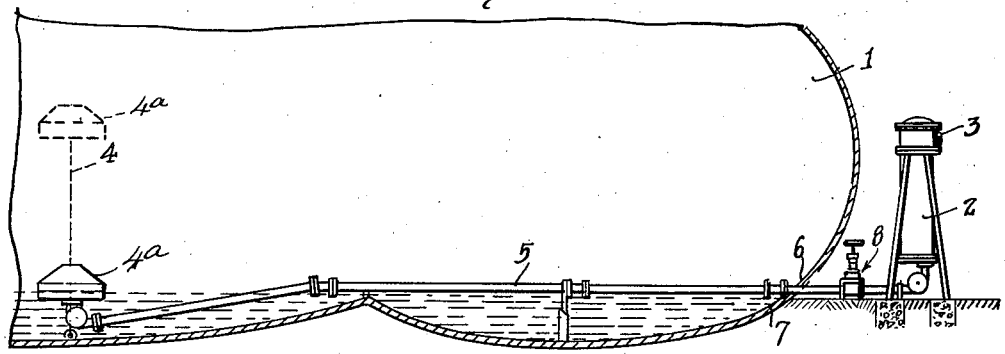
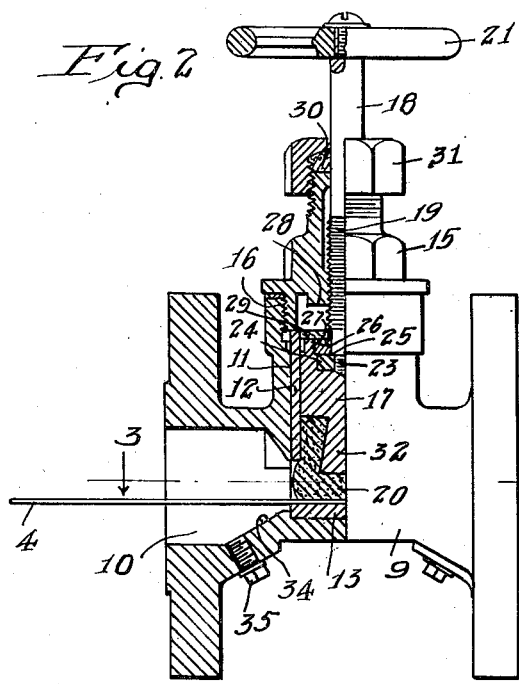
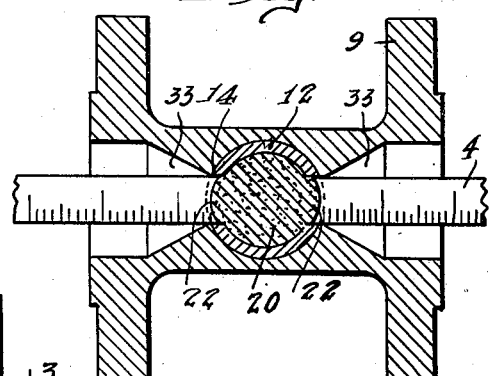
Inventor
Frank V. Long
By Lyon+Lyon
Attorneys Patented Oct. 15, 1940

2,217,959

UNITED STATES PATENT OFFICE 2,217,959

GAUGE APPARATUS FOR TANKS

Frank V. Long, Compton, Calif.

Application August 16, 1938, Serial No. 225,115

3 Claims. (Cl. 73—321)

This invention relates to gauge apparatus for tanks, and is particularly useful when employed in gauge apparatus in which a gauge line or tape passes through a duct to the exterior of the tank where the gauge reading box is located. In this type of apparatus the gauge reading is taken through a transparent window, and if the window becomes broken accidentally, a loss of liquid and/or gas from the tank would occur until the gauge apparatus could be repaired. The invention is also useful in this connection because it enables the indicator and reading box to be disconnected when desired, without disconnecting the gauge line from the float on the inside of the tank.

An object of the invention is to provide gauge apparatus so constructed as to enable the tape line duct to be readily closed when desired, without necessitating the removal of the tape.

A further object of the invention is to provide the duct with special features of construction enabling a substantially liquid-tight closure of the duct to be effected around the gauge line.

Further objects of the invention will appear hereinafter.

The invention consists in the novel parts and combination of parts to be described hereinafter, all of which contribute to produce an efficient gauge apparatus for tanks.

A preferred embodiment of the invention is described in the following specification, while the broad scope of the invention is pointed out in the appended claims.

In the drawing:

Fig. 1 is a vertical section taken through the side wall of a tank broken away and illustrating a gauge apparatus of my invention.

Fig. 2 is a side elevation and partial section upon a large scale, of the means employed in the duct for enabling the duct to be closed when desired. This view also shows a portion of the gauge line passing through the duct.

Fig. 3 is a horizontal section taken about on the line 3—3 of Fig. 2.

Fig. 4 is a side elevation of the lower end of the plug and sleeve, broken away and shown partially in section.

Referring to Fig. 1, the tank 1 is provided with gauge apparatus including indicating apparatus 2 on the exterior of the tank and provided with a reading box 3 at which the depth of liquid in the tank can be read.

This mechanism includes the use of a gauge line 4 preferably in the form of a non-corrosive flat graduated tape that passes down from a float 4a and is guided out to the reading box through a duct 5, preferably in the form of a pipe line consisting of sections secured together.

At the point 6 where the pipe line emerges through the tank wall 7, of course, a leak-tight connection is made to the tank wall.

In accordance with my invention I provide means 8 in the pipe line including two separable parts between which the gauge line lies for closing the duct through it, in spite of the presence of the gauge line.

The means 8 preferably resembles a valve in its general construction although it is only to be closed at rare intervals or in case of an accident to the indicating apparatus 2. Its preferred construction is illustrated in detail in Figs. 2 to 4, and includes a body 9 having a passage 10 through the same, and having a lateral opening 11 in which a sleeve 12 is mounted, said sleeve having an inner head or end wall 13, the upper face of which acts as a seat, across which the gauge tape 4 extends. To permit this, the side wall of the sleeve 12 is provided with ports 14 that register with the passage 10 (see Fig. 3).

The sleeve 12 is preferably of rigid material such as bronze. The sleeve may be secured in place by a bonnet 15, connected by threads 16 at the mouth of the lateral opening 11.

In order to close the passage and form a tight seal around the gauge line or tape 4, I provide a plug 17 movably mounted in the sleeve 12 and preferably attached by a swivel connection to the lower end of a stem 18 having a threaded connection 19 with the bonnet 15. The lower end of this plug carries a head 20 of relatively soft compressible material. Synthetic rubber is the preferable composition for this head 20 because it can be readily deformed under slight pressure, and it has the added advantage that it is substantially impervious to the action of oil, gasoline, and many other liquids that may be stored in tanks such as the tank illustrated.

Whenever it becomes necessary to close the duct 5, the rotation of hand wheel 21 will force the compressible head 20 down onto the tape 4, clamping the same against its seat at 13, and pressing against its upper face and side edges, so as to close off any possibility of flow along the tape and past the compressible head. The head 20 also under the action of the pressure upon it, extrudes itself slightly into the ports 14 as indicated at 22, thereby effectively closing these ports.

The swivel connection between the inner end of stem 18 and the plug, may include a threaded tip 23 receiving a nut 24 seating under a shoulder 25, and under a ring 26 that is threaded to screw into a threaded socket 27 in the upper end of the plug 17. The ring 26 should have socket holes for a spanner wrench.

Of course, normally the plug 17 is in a retracted position to permit free movement of the tape 4 through the passage 10, the upper end of the plug being backed up against a seat 28; and in order to pack the stem in this position, I provide a soft washer 29 carried on the upper face of the plug. The outer end of the stem 18 may be also packed by a lead packing washer 30 under a packing nut 31.

The soft head 20 may be held on the end of the plug by providing the plug with a tip 32 of dovetail cross-section, and shaping the head 20 to conform to the same. The outside diameter of the soft head, however, should be slightly less than the inside diameter of the sleeve 12 to insure that the head will slide back freely to its withdrawn position, (see Fig. 4).

In order to facilitate threading the gauge line through the passage 10, this passage is preferably formed with tapering necks 33 with inclined side faces 34.

Clean-out plugs 35 may be provided in these necks 33 for clearing them of bottom sediment from time to time.

A radial dowel pin 12a may be provided on the sleeve 12 to be received in a dowel socket in the body 9 to prevent the sleeve from twisting on its axis. This assures that the ports 14 will always align with the passage 10 through the body.

It is understood that the embodiment of this invention described herein is only one of the many embodiments this invention may take, and I do not wish to be limited in the practice of the invention, nor in the claims, to the particular embodiment set forth.

What I claim is:

1. In a depth gauge apparatus for tanks or the like, the combination of a body with a passage therethrough, a sleeve mounted in said body, with an end wall forming a rigid seat, said sleeve having openings through the side wall thereof substantially aligning with said passage, a plug guided to move within the sleeve, means operable at will to move the plug toward the seat, a movable gauge line passing through the passage and through said openings, and a head of compressible material carried by the plug to press the line upon the seat and close off flow through the passage.

2. In a depth gauge apparatus for tanks or the like, the combination of a body having a passage through the same, and having a laterally extending opening, a sleeve in said opening, having an end wall forming a seat and having ports through its side wall to register with the passage, a plug movably mounted in said sleeve, a bonnet retaining the sleeve, a gauge line passing through the sleeve and the passage, and a relatively soft head carried by the plug for clamping the gauge line against the seat and for closing the said ports in the sleeve.

3. In a gauge apparatus for gauging the depth of liquid in a tank or the like, the combination of a duct leading from the interior of the tank to the exterior, a body connected in said duct, having a passage, a movable gauge line passing from the interior through said duct and passage, and means including two separable parts, separable at will, associated with the said body and capable of movement toward each other to close the passage around said gauge line.

FRANK V. LONG.